United States Patent
Ishiki et al.

(10) Patent No.: US 9,856,965 B2
(45) Date of Patent: Jan. 2, 2018

(54) METAL CORE FOR RESIN GEAR AND RESIN GEAR COMPOSITE MEMBER

(71) Applicant: NETUREN CO., LTD., Tokyo (JP)

(72) Inventors: Nobumoto Ishiki, Tokyo (JP); Ryosuke Suzuki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 0 days.

(21) Appl. No.: 14/894,046

(22) PCT Filed: May 28, 2014

(86) PCT No.: PCT/JP2014/064793
§ 371 (c)(1),
(2) Date: Nov. 25, 2015

(87) PCT Pub. No.: WO2014/192966
PCT Pub. Date: Dec. 4, 2014

(65) Prior Publication Data
US 2016/0123451 A1    May 5, 2016

(30) Foreign Application Priority Data
May 31, 2013    (JP) ................................ 2013-116424

(51) Int. Cl.
*F16H 55/12*        (2006.01)
*F16H 55/22*        (2006.01)
(Continued)

(52) U.S. Cl.
CPC ............. *F16H 55/22* (2013.01); *B62D 3/04* (2013.01); *F16H 55/06* (2013.01); *F16H 2055/065* (2013.01)

(58) Field of Classification Search
CPC ...... F16H 2055/065; F16H 55/06; B62D 3/04
See application file for complete search history.

(56) References Cited

U.S. PATENT DOCUMENTS

| 2002/0056588 A1* | 5/2002 | Kuze ................... | B62D 5/0409 180/444 |
| 2008/0178697 A1* | 7/2008 | Imagaki ............... | B62D 5/0409 74/388 PS |

(Continued)

FOREIGN PATENT DOCUMENTS

| CN | 202560982 | 11/2012 |
| JP | 55-123043 | 9/1980 |

(Continued)

OTHER PUBLICATIONS

International Search Report dated Aug. 27, 2014 in corresponding International Application No. PCT/JP2014/064793.

*Primary Examiner* — Jake Cook
(74) *Attorney, Agent, or Firm* — Wenderoth, Lind & Ponack, L.L.P.

(57) ABSTRACT

A metal core for a resin gear and a resin gear composite member are provided. The metal core includes a boss portion into which a shaft is press-fitted, a ring portion to which an outer peripheral resin is joined, and a connecting portion via which the boss portion and the ring portion are coaxially provided. The boss portion is arranged on one side of the connecting portion at an inner circumference of the connecting portion and extends annularly in an axial direction. The ring portion is arranged on the same side of the connecting portion at an outer circumference of the connecting portion and extends annularly in the axial direction. The boss portion, the connecting portion, and the ring portion are formed of an integrally continuous material. The boss portion is thicker than the connecting portion and the ring portion.

10 Claims, 2 Drawing Sheets

(51) Int. Cl.
*B62D 3/04* (2006.01)
*F16H 55/06* (2006.01)

(56) References Cited

U.S. PATENT DOCUMENTS

2009/0282939 A1* 11/2009 Rogowski ............... F16H 55/06
　　　　　　　　　　　　　　　　　　　　　74/424.5
2010/0031765 A1　　2/2010　Suzuki

FOREIGN PATENT DOCUMENTS

| JP | 2001-141033 | 5/2001 |
| JP | 2004-204902 | 7/2004 |
| JP | 2009-280161 | 12/2009 |
| JP | 2011-106575 | 6/2011 |

* cited by examiner

METAL CORE FOR RESIN GEAR AND RESIN GEAR COMPOSITE MEMBER

TECHNICAL FIELD

The present invention relates to a metal core for a resin gear, the metal core being used such that an outer peripheral resin is joined to an outer circumferential surface of a ring portion and a shaft is press-fitted into a boss portion, and to a resin gear composite member having the metal core and the outer peripheral resin welded to the metal core.

BACKGROUND ART

Related art resin gears are configured such that an outer peripheral resin is joined to an outer circumferential surface of a metal core. For example, a worm wheel of a power steering apparatus may be configured as a resin gear in which an outer peripheral resin is joined to the outer circumferential surface of a metal core and is provided with gear teeth (see, e.g., JP2001-141033A and JP2011-106575A). By using a resin, weight of the worm wheel is reduced and a gear meshing sound is prevented.

The metal core has a boss portion into which a shaft is press-fitted, a ring portion to which an outer peripheral resin is joined, and a connecting portion connecting the boss portion and the ring portion. To the shaft, a steering force is transmitted from a steering wheel, and a reaction force is transmitted from the road surface. Therefore, sufficient joining strength is required between the boss portion and the shaft.

The metal core disclosed in JP2001-141033A is manufactured by forging a disk-shaped metal material to have a shape like a deep dish and by forming a shaft hole in the boss portion an outer circumferential concave-convex section on the ring portion. On the other hand, according to the example disclosed in JP2011-106575A, the metal core is manufactured by, among cutting, forging, sheet-metal pressing and the like, pressing a sheet metal to save cost.

According to the example disclosed in JP2001-141033A, because the metal core is manufactured by forging to have a shape like a deep dish, it is possible to reduce weight while ensuring strength by wall thickness. However, the metal core is large in the axial direction. If the boss portion and the ring portion are designed to be arranged in a radially overlapping manner to reduce the size in the axial direction, the pressing pressure needs to be significantly increased, because thick material is used to ensure sufficient strength. This consequently requires large facilities, and manufacturing is not easy.

According to the example disclosed in JP2011-106575A, the metal core is manufactured by a sheet-metal pressing. By using a thin plate, it is possible to easily arrange the boss portion and the ring portion in a radially overlapping manner so as to reduce the size and weight of the metal core. However, because the strength of metal core is lowered, the shaft cannot be press-fitted with a sufficient strength. It is possible to ensure strength by using a thicker plate. This, however, increases the weight of the metal core as well as the pressing pressure. Therefore, large facilities are required, and manufacturing is not easy.

SUMMARY OF INVENTION

It is an object of the present invention to provide a metal core for a resin gear that can be manufactured easily while ensuring strength and sufficiently reducing weight and size, and a resin gear composite member having the metal core.

According to an aspect of the present invention, a metal core for a resin gear is provided. The metal core includes a boss portion into which a shaft is press-fitted, a ring portion having an outer circumferential surface provided with a concave-convex structure and to which an outer peripheral resin is joined, and a connecting portion via which the boss portion and the ring portion are coaxially provided. The boss portion is arranged on one side of the connecting portion at an inner circumference of the connecting portion and extends annularly in an axial direction. The ring portion is arranged on the same side of the connecting portion at an outer circumference of the connecting portion and extends annularly in the axial direction. The boss portion, the connecting portion, and the ring portion are formed of an integrally continuous material. The boss portion is thicker than the connecting portion and the ring portion. The metal core can be suitably used, in particular, as a metal core for a resin gear of a power steering apparatus.

A thickness of the boss portion may be in a range of 1.1 or more to 1.3 or less times a maximum thickness of the ring portion. A portion between the boss portion and the connecting portion and a portion between the connecting portion and the ring portion may each be formed with a continuous metal flow.

According to another aspect of the present invention, a resin gear composite member is provided. The resin gear composite member includes the metal core described above, and an outer peripheral resin welded to the outer circumferential surface of the ring portion of the metal core. The outer peripheral resin is provided with gear teeth.

According to the above aspect of the present invention, the boss portion and the ring portion extend annularly in the axial direction and are made of an integrally continuous material via the plate-shaped connecting portion. In addition, the boss portion is made thicker than the connecting portion and the ring portion. Therefore, there is no locally excessively thin part on the boss portion, the ring portion, or the connecting portion, so that the strength of each portion can be ensured. Furthermore, the boss portion, the connecting portion, and the ring portion continuous with each other and there are no boundaries between the boss portion and the connecting portion and between the connecting portion and the ring portion. Therefore, the connecting strength between respective portions can be ensured. In addition, although the boss portion, the connecting portion, and the ring portion are made of an integrally continuous material, the boss portion is made thicker than the connecting portion and the ring portion. Therefore, it is possible to reliably ensure the strength of the boss portion into which the shaft is press-fitted. Accordingly, since the respective strengths of the boss portion, the connecting portion, the ring portion, the connection between the boss portion and the connecting portion, and the connection between the connecting portion and the ring portion can be ensured, it is possible to sufficiently reduce the weight while securing the strength, by making each portion as thin as possible.

The entire axial length of the metal core can be shortened since the annular boss portion and the annular ring portion are connected on the same side of the plate-shaped connecting portion at the inner circumference and the outer circumference of the connecting portion. In addition, the boss portion is made thicker than the connecting portion and the ring portion, thereby forming a thinned product. Therefore, the product can be easily manufactured by pressing the plate material in the thickness direction using dies, thereby making the manufacturing easier.

Consequently, it is possible to provide a metal core that can be manufactured easily while ensuring strength and sufficiently reducing the weight and size, and the resin gear composite member having the metal core.

DESCRIPTION OF EMBODIMENTS

Hereinafter, an embodiment of the present invention will be described in detail with reference to the accompanying drawings. The embodiment will be described in relation to an example of a metal core for a resin gear which is used in a worm wheel of a power steering apparatus and an example of a resin gear composite member.

Figure 1:
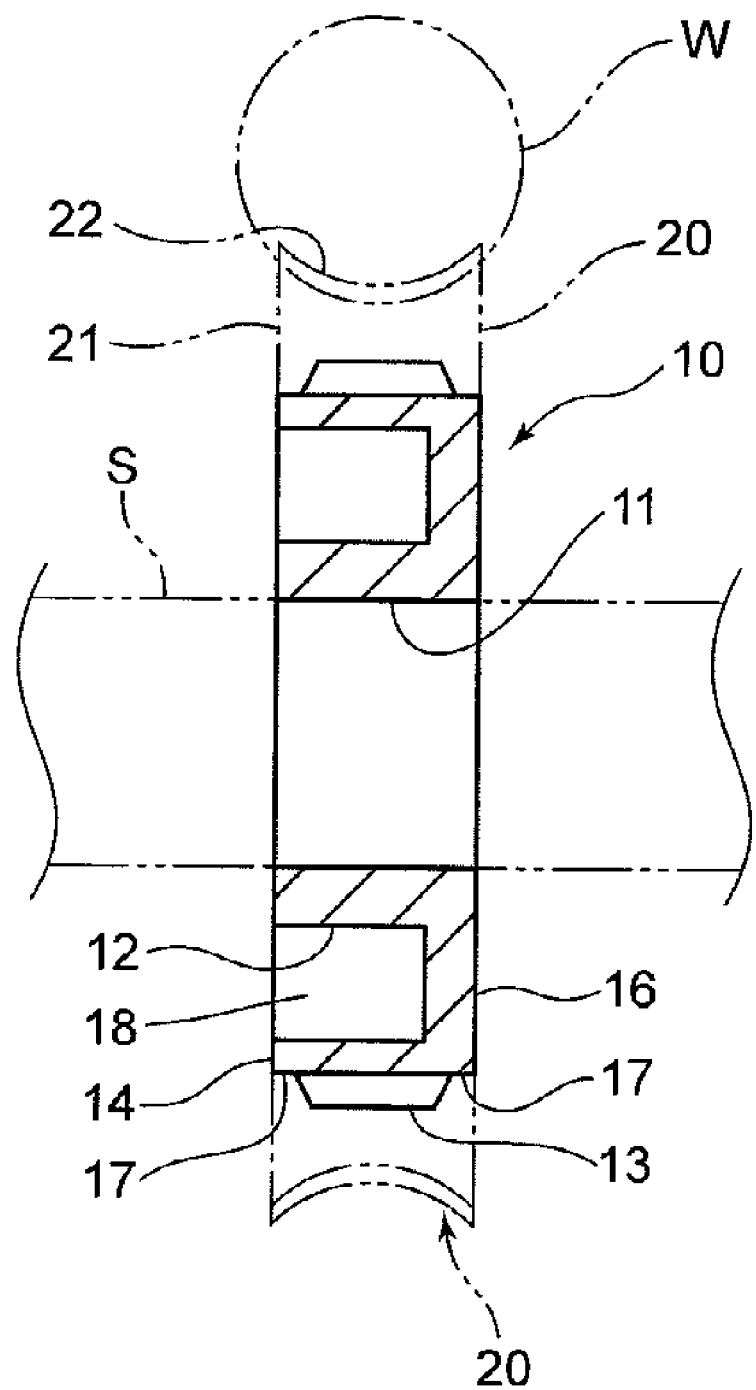
FIG. 1 is a cross-sectional view illustrating a metal core and a resin gear composite member according to an embodiment of the present invention.
Figure 2:
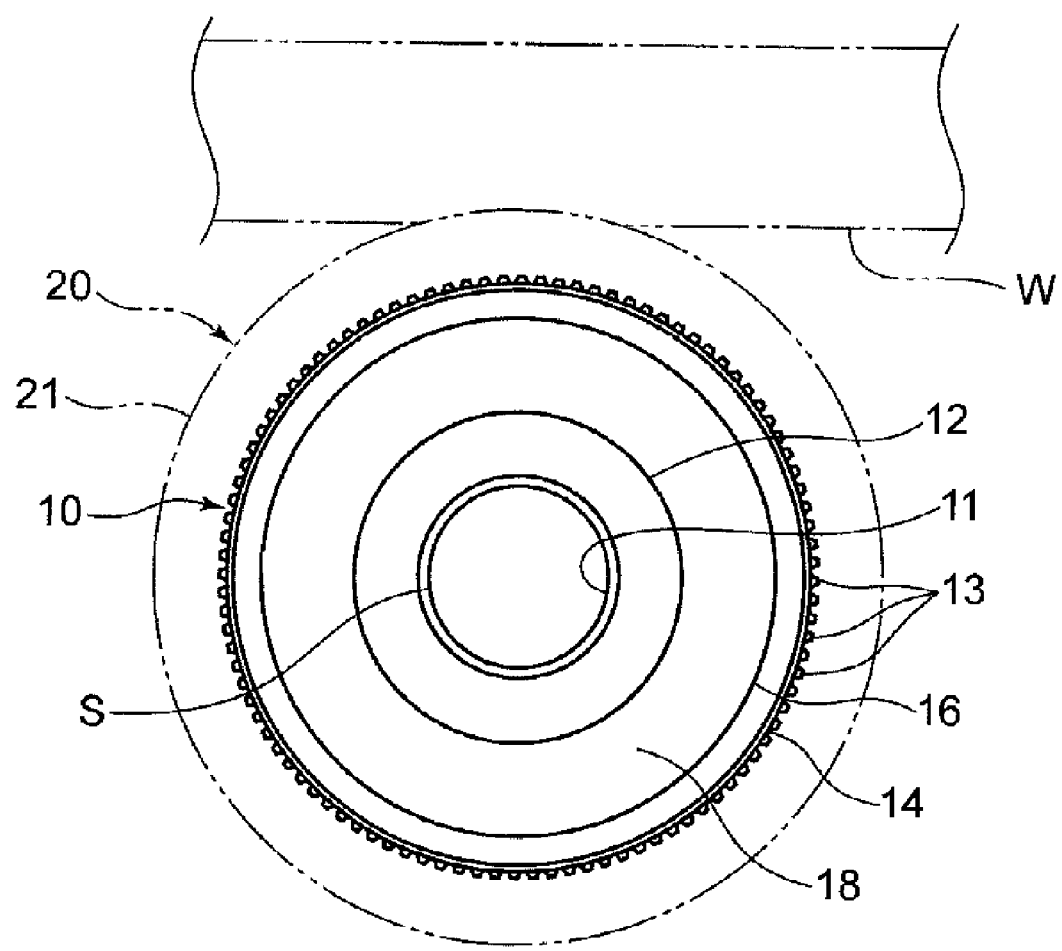
FIG. 2 is a front view illustrating the metal core and the resin gear composite member according to the embodiment.

As shown in FIGS. 1 and 2, the composite member 20 of this embodiment includes a metal core 10 and an outer peripheral resin 21 which is fused and joined to the metal core 10. The composite member 20 is configured such that gear teeth 22 are provided on the outer circumferential surface of the outer peripheral resin 21, and a shaft S to which a steering force from a steering wheel or a reaction force from the road surface to a tire is transmitted is press-fitted into a boss portion 12, and a worm W which is rotated by a driving unit such as a motor is screwed to the gear teeth 22 so that the rotating force of the worm W is transmitted to the shaft S through the composite member.

The metal core 10 is made of a metal material, and includes the boss portion 12 and a ring portion 14 which is spaced radially outwards from the boss portion 12. The boss portion 12 and the ring portion 14 are coaxially provided by means of a connecting portion 16. Here, the boss portion 12 and the ring portion 14 are integrally and continuously formed on the same side in the axial direction, thereby forming the connecting portion 16. A hollow section 18 which is opened in one axial direction is formed between the boss portion 12 and the ring portion 14 so that a substantially U-type sectional shape is formed in the diameter direction.

Although the size of each portion of the metal core 10 is not particularly limited, for example, the whole axial length of the metal core is set to less than 2 times the axial length of the boss portion, preferably less than 1.5 times the axial length of the boss portion, thereby reducing the axial size of the metal core 10. Although not specifically limited, the maximum diameter of the ring portion 14, for example, is in a range of 2 to 5 times the outer diameter of the boss portion 12. It is preferred that the maximum diameter of the ring portion 14 be in a range of 10 to 20 times the thickness of the boss portion 12.

The boss portion 12 of the metal core 10 is formed in an annular shape extending in the axial direction. The annular shape has a substantially cylindrical shape in which the thickness is substantially constant and a substantially constant sectional shape continues in the axial direction. The boss portion 12 has an inner through hole into which the shaft S is inserted. The thickness of the boss portion 12 should be formed to provide a strength sufficient to press-fit and fix the shaft S. Therefore, the thickness is made thicker than at least the thickness of the connecting portion 16 and the thickness of the ring portion 14.

The ring portion 14 of the metal core 10 is formed in an annular shape extending in the axial direction. The ring portion is provided with concave-convex structure 13 on the outer circumferential surface of the ring portion 14 along the entire circumference, and smooth sections 17 without concavities or convexities are provided on the respective axial sides of concave-convex structure 13 continuously along the entire circumference.

The annular shape of the ring portion 14 is similar to that of the boss portion. However, the annular shape of the ring portion is formed by the contoured outline of the ring portion since the ring portion 14 is provided with the concave-convex structure 13 so that the maximum thickness of the ring portion is substantially constant around the entire circumference of the ring portion.

The concave-convex structure 13 of the ring portion 14 has the size and shape that allow the outer peripheral resin to be securely fixed to the metal core 10. In this embodiment, the concave-convex structure are provided with a plurality of axially extended row-type concaves or convexes which are arranged in parallel at substantially regular intervals along the entire circumference of the ring portion. The shape of the concaves or convexes can be suitably adjusted. For example, the shape may be a corrugated or zigzag shape in which inclined surfaces having rising and falling gradients are repeated.

The ring portion 14 does not require a sufficient strength since it is larger than the boss portion 12. Accordingly, the ring portion may be formed thinner than the boss portion 12. For this, it is preferred that the thickness of the boss portion 12 be in a range of 1.1 or more to 2 or less times the maximum thickness of the ring portion 14, and more preferably, 1.3 or less times the maximum thickness of the ring portion 14.

If the boss portion 12 is excessively thinner than the maximum thickness of the ring portion 14, the strength or durability to support the shaft S which is press-fitted into the boss portion 12 may become insufficient in the case where the ring portion 14 is formed sufficiently thinner in order to reduce the weight. In contrast, if the boss portion 12 is excessively thicker than the maximum thickness of the ring portion 14, the strength of the ring portion 14 becomes much greater than that of the outer peripheral resin. In this case, a sufficient weight reduction may not be obtained.

The connecting portion 16 of the metal core 10 has a plate shape in which the inner circumference is connected with the boss portion 12 and the outer circumference is connected with the ring portion 14. The plate shape may mean the shape of which the thickness is substantially constant. The connecting portion 16 is formed as a flat plate that may be a disc plate or a curved plate. The connection between the ring portion 14 and the connecting portion 16 and the connection between the connecting portion 16 and the boss portion are respectively formed like a curved shape having a small radius of curvature.

The connecting portion 16 may be formed thinner than the boss portion 12. In addition, the thickness of the connecting portion may be equal to or different from the maximum thickness of the ring portion 14. It is preferred that the thickness of the boss portion 12 be in a range of 1.1 or more to 2 or less times the maximum thickness of the connecting portion 16, and more preferably, 1.3 or less times the maximum thickness of the connecting portion 16.

The radial width of the connecting portion 16, i.e. the distance between the outer circumference of the boss portion 12 and the inner circumference of the ring portion 14, may be formed larger than the thickness of the boss portion 12. When this distance is enlarged, the boss portion 12 and the ring portion can be formed thinner, thereby reducing the weight.

In this metal core 10, the boss portion 12, the connecting portion 16, and the ring portion 14 are formed of a metal material in which the three sections integrally continue from each other. It is preferred that at least the connection between the boss portion 12 and the connecting portion 16 and the connection between the connecting portion 16 and the ring portion 14 have no disconnected portion, which is mechanically cut, over the whole length. In particular, it is preferred that at least a portion between the boss portion 12 and the connecting portion 16 and at least a portion between the connecting portion 16 and the ring portion 14 be each formed with a continuous metal flow.

This metal core 10 is manufactured using a manufacturing method which may include a swaging process of shaping a swaged body by pressing the metal plate in the axial direction and a forging process of changing the thickness of the swaged body by pressing the swaged body in the axial direction under a higher pressure than in the swaging process.

The metal plate may use a disk-shaped plate having a center hole. The plate can be made of, for example, a metal, such as hot-rolled mild steel (SPHC), although the material for the plate is not specifically limited. It is preferred that the plate be implemented as a metal plate which has undergone phosphate coating or the like.

In the swaging process, for example, the plate may be swaged such that each of the radially intermediate portion, the outer circumferential portion, and the inner circumferential portion are relatively pressed in the axial direction. This deforms the plate so that the outer circumferential portion and the inner circumferential portion are deformed toward one side in the axial direction with respect to the intermediate section, thereby forming a swaged body. In the swaged body, a substantially U-shaped section extends annularly, and one axial side is closed whereas the other axial side is opened.

In the forging process, the swaged body is forged by pressing the swaged body in the axial direction under a higher pressure than in the swaging process, using a die which corresponds to the metal core 10, thereby adjusting the thickness and shape of each portion of the swaged body. Simultaneously with this adjustment or by the forging process afterwards, the concave-convex structure 13 may be provided on the outer circumferential surface of the ring portion 14. In the forging process, each portion may be formed thinner than the plate material. In addition, either one of or both the ring portion 14 and the connecting portion 16 may be formed thinner than the plate material. Further, the boss portion 12 may be formed thicker than the plate material. The forging process can be easily carried out since the swaged body has a similar shape to the metal core 10. Finally, an appropriate finishing is carried out so as to manufacture the metal core 10.

A composite member 20 may be produced using the metal core 10 in the following manner. For example, an outer peripheral resin 21 having inner and outer circumferences each having a circular sectional shape is prepared. Then, the cylindrical circumferential resin material 21 is fitted into the ring portion 14 of the metal core 10, and vertices of the concave-convex structure 13 are brought into contact with the inner circumference of the outer peripheral resin 21. In this state, the metal core 10 may be induction heated. This consequently melts the inner circumference of the outer peripheral resin 21 so that the concave-convex structure 13 is welded to the outer circumferential surface of the ring portion 14 while the concave-convex structure 13 is completely buried in the outer peripheral resin 21, thereby manufacturing the resin core composite member 20. The composite member 20 can be provided for use as a worm wheel by forming intended gear teeth 22 on the outer circumferential surface of the outer peripheral resin 21 and press-fitting the shaft into the boss portion 12.

According to the metal core 10 and the composite member using the metal core, the boss portion 12 and the ring portion 14 are made of a material which extends annularly in the axial direction and integrally continue from each other by means of the plate-shaped connecting portion 16. In addition, the boss portion 12 is made thicker than the connecting portion 16 and the ring portion 14. Therefore, there is no locally excessively thin part on either boss portion 12, the ring portion 14, or the connecting portion 16, so that the strength of each portion can be ensured. Furthermore, since there are no boundaries between the boss portion 12 and the connecting portion 16 and between the connecting portion 16 and the ring portion 14, the connecting strength between respective portions can be secured.

In addition, although the boss portion 12, the connecting portion 16, and the ring portion 14 are made of an integrally continuous material, the boss portion 12 is made thicker than the connecting portion 16 and the ring portion 14. Therefore, it is possible to surely secure the strength of the boss portion 12 into which the shaft S is press-fitted. Accordingly, it is possible to sufficiently reduce the weight while securing the strength, by making each portion as thin as possible.

The entire axial length of the metal core can be shortened since the boss portion 12 and the ring portion 14 which are formed in the annular shape are connected on the same side of the inner circumference and the outer circumference of the plate-shaped connecting portion 16. In addition, the boss portion is made thicker than the connecting portion and the ring portion, thereby forming a thinned product. Therefore, the product can be easily formed using the plate material.

In the metal core 10 according to this embodiment, the outer circumference and the inner circumference of the boss portion 12, and the inner circumference, the outer circumference, and the concave-convex structure 13 of the ring portion 14 is respectively provided in the axial direction. In addition, the boss portion 12 and the ring portion 14 are connected to the inner circumference and the outer circumference of the connecting portion 16 and both the boss portion and the ring portion are arranged at the same side in the axial direction with respect to the connecting portion 16. Therefore, it is possible to easily manufacture the metal core 10 by pressing the plate material in the axial direction using, for example, a press machine.

The above-mentioned embodiments can be suitably modified within the scope of the present invention. For example, although the embodiments have illustrated that the resin gear is provided as the worm wheel of a power steering apparatus, the present invention can be applied to other gears. An example has been illustrated that after fitted on the circumference of the ring portion 14 of the metal core 10, the circumferential resin material 21 is welded to the ring portion 14 by induction heating the metal core 10. However, the circumferential resin material 21 may be joined to the outer circumferential surface of the ring portion 14 using other methods. For example, the circumferential resin material 21 may be formed by injection molding a molten resin onto the outer circumferential surface of the metal core 10.

Further, the shape of each portion of the metal core 10 may be changed. Although in the above-mentioned embodiments, the connecting portion 16 of the metal core 10 has been illustrated to be the plate shape, the connecting portion may have other shape if can be formed to connect the boss portion 12 and the ring portion 14.

This application is based on Japanese Patent Application No. 2013-116424 filed on May 31, 2013, the entire content of which is incorporated herein by reference.

The invention claimed is:

1. A metal core for a resin gear, the metal core comprising:
a boss portion into which a shaft is press-fitted;
a ring portion having an outer circumferential surface provided with a concave-convex structure and to which an outer peripheral resin is joined; and
a connecting portion via which the boss portion and the ring portion are coaxially provided,
wherein the boss portion is arranged on one side of the connecting portion at an inner circumference of the connecting portion and extends annularly in an axial direction,
wherein the ring portion is arranged on the same side of the connecting portion at an outer circumference of the connecting portion and extends annularly in the axial direction,
wherein the boss portion, the connecting portion, and the ring portion are formed of an integrally continuous material,
wherein the metal core is made of a metal plate and the boss portion is thicker than the connecting portion and the ring portion, and
wherein the outer circumferential surface of the ring portion includes a smooth section on each of opposite sides of the concave-convex structure in the axial direction, the smooth sections having a same diameter.

2. The metal core according to claim 1, wherein the metal core is adapted to be used for a resin gear of a power steering apparatus, and the boss portion is adapted to receive the shaft to which a steering force is transmitted.

3. The metal core according to claim 1, wherein a thickness of the boss portion is in a range of 1.1 or more to 1.3 or less times a maximum thickness of the ring portion.

4. The metal core according to claim 1, wherein a portion between the boss portion and the connecting portion and a portion between the connecting portion and the ring portion are each formed with a continuous metal flow.

5. A resin gear composite member comprising:
a metal core; and
an outer peripheral resin provided with gear teeth,
wherein the metal core comprises:
a boss portion into which a shaft is press-fitted;
a ring portion having an outer circumferential surface provided with a concave-convex structure and to which the outer peripheral resin is joined; and
a connecting portion via which the boss portion and the ring portion are coaxially provided,
wherein the boss portion is arranged on one side of the connecting portion at an inner circumference of the connecting portion and extends annularly in an axial direction,
wherein the ring portion is arranged on the same side of the connecting portion at an outer circumference of the connecting portion and extends annularly in the axial direction,
wherein the boss portion, the connecting portion, and the ring portion are formed of an integrally continuous material,
wherein the metal core is made of a metal plate and the boss portion is thicker than the connecting portion and the ring portion, and
wherein the outer circumferential surface of the ring portion includes a smooth section on each of opposite sides of the concave-convex structure in the axial direction, the smooth sections having a same diameter.

6. The metal core according to claim 1, wherein the boss portion has an end surface and the connecting portion has an end surface that is coplanar with the end surface of the boss portion.

7. The metal core according to claim 6, wherein the end surface of the connecting portion is continuous with the end surface of the boss portion.

8. The resin gear composite member according to claim 5, wherein the boss portion has an end surface and the connecting portion has an end surface that is coplanar with the end surface of the boss portion.

9. The resin gear composite member according to claim 8, wherein the end surface of the connecting portion is continuous with the end surface of the boss portion.

10. A resin gear composite member comprising:
a metal core; and
an outer peripheral resin provided with gear teeth,
wherein the metal core comprises:
a boss portion into which a shaft is press-fitted;
a ring portion having an outer circumferential surface provided with a concave-convex structure and to which the outer peripheral resin is joined; and
a connecting portion via which the boss portion and the ring portion are coaxially provided,
wherein the boss portion is arranged on one side of the connecting portion at an inner circumference of the connecting portion and extends annularly in an axial direction,
wherein the ring portion is arranged on the same side of the connecting portion at an outer circumference of the connecting portion and extends annularly in the axial direction,
wherein the boss portion, the connecting portion, and the ring portion are formed of an integrally continuous material,
wherein the metal core is made of a metal plate and the boss portion is thicker than the connecting portion and the ring portion, and
wherein the ring portion has a pair of opposing end surfaces and the outer peripheral resin has a pair of opposing end surfaces, each of the opposing end surfaces of the ring portion being coplanar with a respective one of the opposing end surfaces of the outer peripheral resin.

* * * * *